March 11, 1952     S. G. G. LANDERGREN     2,589,096
MOTION TRANSMITTING ARRANGEMENT Filed Feb. 25, 1948     2 SHEETS—SHEET 1

Inventor:
Sture Gustaf Gram Landergren,
By: Pierce, Scheffler & Parker,
Attorneys

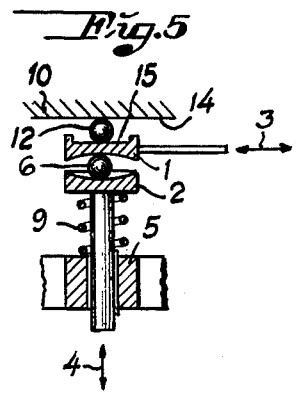

Patented Mar. 11, 1952

2,589,096

UNITED STATES PATENT OFFICE 2,589,096

MOTION TRANSMITTING ARRANGEMENT

Sture Gustaf Gram Landergren, Stockholm, Sweden, assignor, by direct and mesne assignments, of one-half to Sven Goran Kihlberg, Hjo, Sweden, and one-half to Industrial Devices Corporation, Detroit, Mich., a corporation of Michigan Application February 25, 1948, Serial No. 10,777
In Sweden December 9, 1944

Section 1, Public Law 690, August 8, 1946
Patent expires December 9, 1964

6 Claims. (Cl. 74—44)

The present invention refers to an arrangement, by means of which it is possible in an advantageous manner to transmit a movement of a member, designated the primary member in the following, onto another member, the secondary member, which is guided for movement in a direction other than that in which the primary member moves. In particular, the invention aims at facilitating such motion-transmission with relatively small frictional losses. The invention brings about special advantages, if the primary member is comprised as a driven part in a crank or eccentric mechanism and is thus adapted to perform a reciprocating movement, which is not rectilinear, but the invention is also applicable in cases where the primary member has a rectilinear movement.

The substantially distinguishing feature of the invention primarily resides in that a rolling body is adapted to mediate the transmission of movement while rolling on a surface of the primary member and on a surface of the secondary member, one or both of these surfaces being curved and/or obliquely positioned to the direction of movement and/or the guide direction. To ensure the requisite engagement between the surfaces and the rolling body and to facilitate the movement of the secondary member in the guide direction, the rolling body is pressed against the surface of the primary member with a resilient force, such as spring force, the primary member being supported to take up the reactive force in the guide direction. In certain cases, the weight of the secondary member may, if desired together with the weight of parts connected therewith, replace the spring force.

The primary member may be adjustable in various ways to alter the position of the range of movement of the rolling body or the amplitude of its reciprocating movement, whereby the length of stroke of the movement of the secondary member can be altered.

Figure 1:
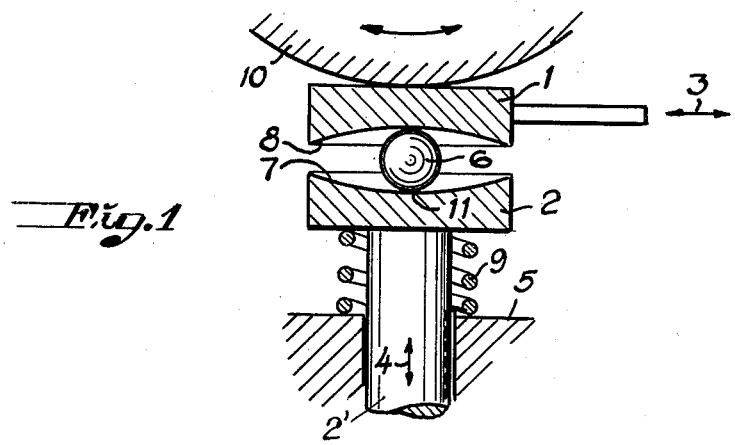
Figure 2:
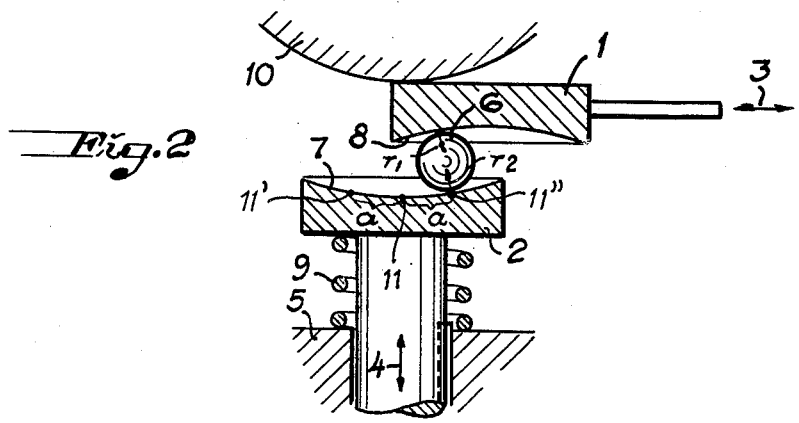

The invention is elucidated more closely in the following by way of a few examples of embodiment illustrated in the accompanying drawings. All figures of the drawings show the arrangement in elevation (partly in section) on a plane containing the directions of movement of the primary and secondary members. Figs. 1 and 2 relate to a first embodiment with the primary member in two different positions. Figs. 3–8 relate to six further embodiments of the invention.

In the drawing, the primary member is designated by 1 and the secondary member by 2.

The primary member is arranged to move back and forth in a direction marked by the double arrow 3 or in directions, the average position of which is marked by this double arrow. The secondary member is guided for movement back and forth in a direction marked by the double arrow 4. The guiding action is taken to be effected by the fact that a rod 2' on the secondary member is displaceably but non-rotatably mounted in a bore in a fixed guide member 5. A rolling body 6, such as a roller, ball or the like (of a cylindrical concave or convex curavture) is arranged between a surface 7 of the primary member and a surface 8 of the secondary member. When the primary member 1 moves to and fro, the rolling body 6 performs a reciprocating movement at simultaneous rolling on the surfaces 7 and 8, the secondary member moving then in the governing direction. The secondary member keeps the rolling body 6 pressed against the surface 8 with a resilient force—brought about here by a spring 9—and the reactive pressure is taken up in the guide direction by a supporting member 10, having the side of the primary member remote from the surface 8 bearing thereon. The supporting member 10 may be a portion of a machine frame or an element mounted in such frame.

In the examples of embodiment shown, the primary member is arranged to move, with its surface 8 cooperating with the rolling body, in a principal direction forming a right or approximately right angle with the guide direction for the secondary member 2, that is to say, the directions 3 and 4 form a right or approximately right angle with each other, other angles being conceivable, however.

According to Fig. 1, the surface 7 of the secondary member is curved and concave in a direction toward the rolling body 6. It has its lowest point 11—minimum point—at the center of the guided rod 2' of the secondary member 2. The primary member may be driven so that the rolling body 6 will roll by equal distances $a$ to the left and the right of the point 11, the center of the rolling track of the rolling body on the surface 7 thus coinciding with the lowermost point 11. It is also possible to arrange the primary member to be adjustable so that the range of movement of the rolling body 6 is entirely to the left or entirely to the right of the point 11, the center of the track of movement becoming thus situated in the point 11' or 11''. If the length of stroke of the primary member is the same as in the former case, the rolling body will roll higher up on the surface 7, by reason of which the secondary member 2 obtains a greater length of stroke. On the other hand, the number of strokes will, at an unchanged number of strokes of the primary member, be only half as large in the secondary member, since the rolling body 6 moves only on the one side of the point 11 toward both sides. It is thus possible by a simple displacement of the primary member to double the number of strokes of the secondary member. The amplitude of the reciprocating movement of the rolling body may thus be controlled by an alteration of the length of stroke of the movement of the primary member.

According to Figs. 1 and 2, both surfaces 7 and 8 are curved and concave in a direction toward the rolling body 6. The configuration of the surfaces is advantageously such that the reactive pressures $r_1$, $r_2$ from the surfaces 8 and 7 on the rolling body become directed, both of them, along the same diameter of the rolling body 6, while components of force are avoided in the tangential direction of the surfaces. Hereby, displacement of the rolling body is avoided relatively to the surfaces, that is to say, the movement of the rolling body will be a pure rolling movement. If the surfaces have a configuration such that the reactive forces fall along different diameters of the rolling body, half of the angle which these diameters form with one another should be smaller than the friction angle at the contact points between the surfaces and the rolling body. Various measures of expediency may be undertaken to increase the friction angle, if the configuration of the surfaces so demands, and it is also conceivable to use pressures of engagement between the rolling body and the surfaces so high that the latter are elastically deformed at the point of engagement, a sort of tooth engagement being thus produced, which prevents any sliding movement.

The supporting member 10 may be formed in various ways to reduce the friction at the movement of the primary member relatively to the same. The supporting member may be stationary and have a convex surface, as in Figs. 1 and 2, the primary member then bearing thereon along a line. Here, however, a sliding friction will be produced at the movement of the primary member. The supporting member may therefore be constituted by a trundle, roller or the like, which is mounted so as to turn about an axis perpendicular to the direction 4, said axis intersecting said direction. However, the support may be mediated still better by a roller which is free to roll along the primary member in the same manner as the roller 6, the bearing friction being thus avoided.

Figure 3:
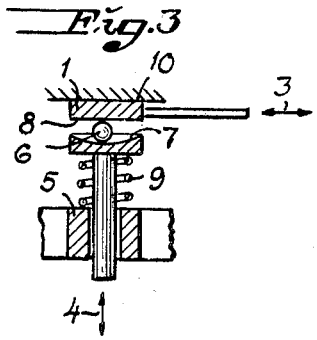

In the embodiment according to Fig. 3, the surface 8 of the primary member cooperating with the rolling body 6 is plane, whereas the surface 7 is concave. The primary member 1 is conceived as having a rectilinear reciprocating movement.

Figure 4:
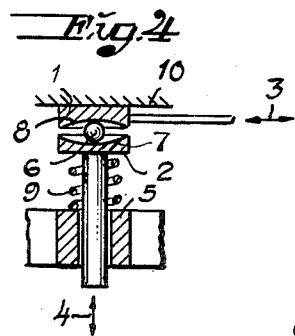

According to Fig. 4 the surface 8 is also curved, and it is obvious that the length of stroke of the secondary member 2 becomes greater here than in Fig. 3, inasmuch as the curvature of the surface 7 as well as that of the surface 8 contributes to the displacement of the secondary member in the govering direction. Both in Fig. 3 and in Fig. 4, the support 10 forms a rigid plane bearing surface for the upper side of the primary member 1, a relatively great sliding friction thus occurring here.

According to Fig. 5, the friction has been reduced by the arrangement of a rolling body 12 between the supporting surface 14 of the supporting member 10 and the supporting surface 15 of the primary member. The supporting surface 15 is plane the same as the supporting surface 14. However, one or both of the supporting surfaces may be curved, preferably concave. The latter alternative is illustrated in Fig. 6. On the assumption of the same radius of curvature for the curved surfaces in the embodiments according to Figs. 3-6, and also of the same movement of the primary member, the length of stroke of the secondary member will of course be greater in the embodiment according to Fig. 6 than in any of the preceding constructions.

The embodiments according to Figs. 5 and 6 have the advantage over those shown in Figs. 3 and 4 that the primary member need not have an exact rectilinear movement but may swing up and down during the movement. Therefore, it may be constituted by or be directly connected with the reciprocable driving means such as the eccentric rod or the connecting rod in an eccentric or crank driving mechanism imparting the reciprocating movement to the primary member. In Fig. 6, the primary member is shown as being directly connected to an eccentric strap 16 on an eccentric 17, which is secured on a shaft 18, which may be driven by a suitable motor. It is evident that a driving means of this construction will run extremely lightly. If the working pressure acts upwardly in the guide direction, for instance because the secondary member carries a tool in operation, only a portion of this pressure will be transmitted to the driving mechanism, inasmuch as the greater portion is taken up by the supporting member 10, i. e. at mediation of the rolling bodies 6 and 12, whereby the friction losses may be kept low also in the driving mechanism.

Adjustment of the range of movement of the rolling body 6, as referred to in connection with Fig. 2 above, may be effected in the embodiment illustrated in Fig. 6 and other figures by making connection member of the primary member 1 as two telescopic rods 16a and 16b as indicated in Fig. 6, a set screw 16c being mounted to enable locking of the rods 16a, 16b in the adjusted position.

Variation of the amplitude of reciprocating movement of the primary member may be accomplished by displacement of the eccentric 17 radially relatively to shaft 18 which is made possible by a slot 17' for shaft 18 in eccentric 17.

In certain cases, where the number of strokes of the secondary member need not be doubled relatively to that of the primary member, whereas it is desirable to obtain a relatively great length of stroke for the secondary member, the surfaces 7 and 8 may be arranged in their entirety at an inclination relatively to the directions 4, as indicated in Fig. 7.

It is conceivable to vary the length of stroke of the secondary member 2 within certain limits before or during the movement by disposing one or both of the surfaces 7 and 8 obliquely. According to Fig. 8, the surface 8 is formed on a part 20, which is provided with pins 21 having rods 22 mounted thereon. These rods are adapted to impart the reciprocating movement to the part 20. Furthermore, the part 20, which forms the primary member together with the rods 22, is provided with an upwardly projecting arm 23, in which a control rod 24 is mounted with one end thereof. The control rod 24 participates in the reciprocating movement of the rods 22, but may be displaced relatively to the latter, so that the part 20 turns more or less about the pins 21, whereby the inclination of the surface 8 can be controlled. Similarly, the surface 7 may be formed on a part which, besides, is adjustable relatively to the secondary member, and which may be connected with the part 20 in such manner that the surfaces will be adjusted simultaneously to a suitable angle.

The invention is not limited to the embodiments shown, which are only intended to elucidate some of the applications of the principle of the invention that may occur. Various combinations of the embodiments shown are of course conceivable.

A motion-transmitting arrangement of the kind described may be brought into use in a great variety of machines for different purposes, for instance in riveting machines, plate shearing machines, sewing machines, valve mechanisms for motors of different kinds, and so forth. In plate shearing machines the secondary member 2 is formed to receive a cutting tool adapted to cooperate with a stationary tool for cutting the work.

What I claim is:

1. A motion transmitting mechanism, comprising reciprocable driving means, a primary member connected with said driving means and reciprocable thereby in a certain main direction, a secondary member guided for movement in a direction different from said main direction, a support member forming an arcuate bearing surface in rolling contact with said primary member, said primary and secondary members having opposed surfaces, a rolling member disposed between and in rolling contact with said opposed surfaces, one of said opposed surfaces being arcuately concave throughout the area thereof contacted by said roller member, whereby actuation of said driving means serves to impart oscillatory reciprocating motion to the primary member, and the roller member by rolling in contact with said opposed surfaces imparts movement to the secondary member.

2. A motion transmitting mechanism as claimed in claim 1 in which the opposed surfaces on both the primary and secondary members are arcuately concave throughout the area thereof contacted by said roller member.

3. A motion transmitting mechanism as claimed in claim 2, and means to adjust the primary member relatively to the secondary member to change the center of the reciprocating motion of the rolling member relative to the lowest or highest points of the opposed curved surfaces on the primary and secondary members.

4. A motion transmitting mechanism as claimed in claim 2, and means to change the amplitude of the reciprocating motion imparted to the primary member whereby to vary the stroke of the secondary member.

5. A motion transmitting mechanism as claimed in claim 1 in which the support member includes a stationary concave surface facing said primary member and a rolling member is interposed between them to establish the rolling contact therebetween.

6. A motion transmitting mechanism as claimed in claim 1 in which the supporting member is a roller member journalled on an axis normal to the guide direction of the secondary member and to the main direction of reciprocation of the primary member and is in direct engagement with the primary member.

STURE GUSTAF GRAM LANDERGREN.

REFERENCES CITED

The following references are of record in the file of this patent:

UNITED STATES PATENTS

| Number | Name | Date |
|---|---|---|
| 1,218,771 | Hoeschen | Mar. 13, 1917 |
| 1,634,861 | Weymann | July 5, 1927 |
| 1,799,229 | Hanna | Apr. 7, 1931 |
| 1,816,677 | Hanna | July 28, 1931 |
| 1,905,047 | Norin | Apr. 25, 1933 |
| 2,123,008 | Hayes | July 5, 1938 |

FOREIGN PATENTS

| Number | Country | Date |
|---|---|---|
| 193,944 | Great Britain | Feb. 28, 1923 |